(12) United States Patent
Smith et al.

(10) Patent No.: US 6,430,160 B1
(45) Date of Patent: Aug. 6, 2002

(54) ESTIMATING DATA DELAYS FROM POISSON PROBE DELAYS

(75) Inventors: Donald E. Smith, Lexington; Man Li, Bedford, both of MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/515,927

(22) Filed: Feb. 29, 2000

(51) Int. Cl.[7] ............................................. H04L 15/56
(52) U.S. Cl. ...................... 370/252; 370/231; 370/236; 370/410; 709/224; 709/233
(58) Field of Search ................................ 370/252, 231, 370/236, 409, 410, 519, 235; 709/226, 223, 224, 233, 234, 235, 238; 705/8, 9, 14, 22

(56) References Cited

U.S. PATENT DOCUMENTS

| | | | | |
|---|---|---|---|---|
| 5,408,465 A | * | 4/1995 | Gusella et al. ................ | 370/17 |
| 5,477,531 A | * | 12/1995 | McKee et al. ................ | 370/17 |
| 5,946,662 A | * | 8/1999 | Ettl et al. ..................... | 705/8 |
| 6,023,681 A | * | 2/2000 | Whitt ............................ | 705/8 |
| 6,115,462 A | * | 9/2000 | Servi et al. .................. | 379/221 |
| 6,192,406 B1 | * | 2/2001 | Ma et al. ..................... | 709/226 |
| 6,215,772 B1 | * | 4/2001 | Verma ......................... | 370/236 |
| 6,226,266 B1 | * | 5/2001 | Galand et al. .............. | 370/235 |

OTHER PUBLICATIONS

R. Wolff, *Poisson arrivals see time averages*, Operations Research 30, 223 (1982).
S. Asmussen, *Applied Probability and Queues*, New York: John Wiley & Sons, 1987, Chapt. VIII.
D. Williams, *Probability with Martingales*, Cambridge University Press, 1991, Chapter 12.
D. D. Yao, *On Wolff's Pasta Martingale*, Operations Research 40, S352 (1992).
S. Brumelle, *On the relation between customer and time averages in quenes*, J. Appl Prob. 8, 508 (1971).
R. M. Loynes, *The stability of a queue with non–independent inter–arrival and service times*, Proc. Camb. Philos. Soc. 58, 497 (1962).

* cited by examiner

*Primary Examiner*—Wellington Chin
*Assistant Examiner*—M. Phan
(74) *Attorney, Agent, or Firm*—Leonard Charles Suchyta; James K. Weixel

(57) ABSTRACT

A method (1000) of estimating the delays that data packets experiences along a path in an IP network is presented. The method involves sending probe packets (102), transmitted along the same path as the data whose delays are to be estimated, with a frequency dictated by statistics that include Poisson statistics. Information obtained about the delays in the probe packet transmissions may be used to estimate data delays.

23 Claims, 8 Drawing Sheets

ESTIMATING DATA DELAYS FROM POISSON PROBE DELAYS

FIELD OF THE INVENTION

This application relates to the field of computer network performance and more particularly to estimating data delays that packets encounter as they are routed through a network.

BACKGROUND OF THE INVENTION

As IP networks move toward improving quality of service, Internet service providers (ISP) have been including quality of service into their service level agreements with customers. The quality of service in service level agreements may include network availability and reachability. ISPs may also include end-to-end delay benchmarks within their network into service level agreements. Such benchmarks may allow ISPs to provide better services to existing applications, such as Web browsing, as well as to new emerging services such as IP telephony and e-commerce, by providing guarantees of achieving such benchmarks.

The ability to measure quality of service may be critical to ensure that the network delivers the performance that the service level agreement promises. Measurement tools may monitor the network for compliance with the service level agreement, and identify where the provider needs to allocate more network resources.

The ability to measure quality of service may be critical to ensure that the network delivers the performance that the service level agreement promises. Measurement tools may monitor the network for compliance with the service level agreement, and identify where the provider needs to allocate more network resources.

Probe packets may be used to measure delays. Probe packets are packets that an experimenter injects into the network with the intention of measuring some aspect of their behavior, such as delay. Although probe packets could be actual user data packets, typically they are not because the experimenter wants to control the probes behavior more fully than the user's application would permit. For example, the experimenter might wish to prescribe exactly when probes are transmitted or to set the packets sizes. The experimenter might want to make the packets as small as possible to minimize their usage of network resources. Injecting probe packets into a network involves the routine use of standard networking utilities available on any PC or workstation.

One technique for estimating benchmarks related to end-to-end data traffic delay is to send small probe packets and measure their delays. For example, the Internet utility "Ping" measures the delays that the probe packets experience as they travel from one network location to another. One-way delay measurements require the clocks at the two endpoints to be synchronized, but round trip delay measurements require only that the router at the destination reflect probe packets back to the source. Many ISPs use probes to measure delay performance within their networks. Some commercial companies use probes to measure and compare different ISP network performance.

To determine what probes really measure, account may have to be made for the fact that probes and data may "see" different delay distributions because they arrive differently to a queuing system. Data traffic might be bursty, causing a later arrival to "see," and be delayed by, an earlier data packet. Probes may see the effects of data traffic burstiness differently.

To determine how well probes measure delays, account may have to be made for sampling error, which arises since only finitely many probes in a given time interval are obtained.

By sampling from various distributions, ensemble averages of various quantities of interest such as average delay time, may be obtained. As is common in ergodic theory, conditions may be examined under which these ensemble averages are approximated by time averages. For example, Ping samples periodically (one probe every x seconds). But it may be difficult to estimate how accurately periodic sampling approximates the time average.

Even if these time averages could be accurately estimated by ensemble averaging, there remains the question of how to relate these averages obtained by using probe packets to averages involving data packets. In the prior art, practitioners may erroneously assume that the delays obtained by using probe packets are the same delays that would be experienced by data packets once sampling error is accounted for. Because obtaining probe information may be easier than obtaining data information, there is motivation to invent a method and system to convert information about probe packet delays into data delays.

SUMMARY OF THE INVENTION

The aforementioned problems may be addressed by correctly translating probe delays into data packet delays. For this purpose, a time average may be used as an intermediate quantity to pass from probe delays to data delays. Two parts may be considered. 1) Probe packets are transmitted according to the departure statistics governing a Poisson process; as described in more detail in the Detailed Description below, the user is able to estimate the time average from the probe delays with a prescribed accuracy. 2) The time average may then be related to the data packet delays. The second part is independent of the method used to obtain the time average. Thus, part 1) provides an improved estimate if the time average of the latter is of interest in another application and part 2) translates between time averages and data delays if techniques other than those in part 1) are used to estimate the time average. As an example of part 1), a better estimate of a time average, such as the fraction of time a resource is busy, may be obtained using Poisson sampling instead of periodic sampling. On the other hand, if periodic sampling were used to estimate a time average delay, the methods under 2) could still translate the time average estimate into data delay estimates.

More specifically, a method of estimating data delays in transmitting data packets from a first location to a second location on a computer network is presented including identifying a bottleneck link in a path connecting the first location to the second location; determining a queuing delay of probes at the bottleneck link by injecting probe packets at the first location; and estimating a queuing delay of data from the queuing delay of probes at the bottleneck limit.

The method of estimating data delays may further include adding a sum of data service times and a propagation delay to the queuing delay to obtain an estimate of the data delays. Determining a queuing delay of probes at the bottleneck link by injecting probe packets at the first location may include subtracting a sum of probe service times and a propagation delay from first location to second location probe delays.

Determining a queuing delay of probes at the bottleneck link by injecting probe packets at the first location may include injecting probe packets according to a probability distribution, which may include a Poisson distribution.

The method may further include determining a data packet length distribution served by the bottleneck link.

A method of estimating data delays in transmitting data packets from a first location to a second location on a computer network is also provided. The method includes transmitting probe packets on the computer network; determining probe delays for the probe packets to travel from the first location to the second location; estimating a time average from the probe delays with a prescribed accuracy; and relating the time average to the data delays.

Transmitting probe packets on the computer network may include transmitting probe packets on the computer network from the first location to the second location. Transmitting probe packets on the computer network from the first location to the second location may include transmitting probe packets on the computer network from the first location to the second location according to departure statistics consistent with a stochastic process.

Transmitting probe packets on the computer network from the first location to the second location includes transmitting probe packets on the computer network from the first location to the second location according to departure statistics consistent with a Poisson process.

A system is also provided for estimating data delays in transmitting data packets from a first location to a second location on a computer network including a computer; instructions for the computer for identifying a bottleneck link in a path connecting the first location to the second location; instructions for the computer for determining a queuing delay of probes at the bottleneck link by injecting probe packets at the first location; and instructions for the computer for estimating a queuing delay of data from the queuing delay of probes at the bottleneck limit.

The system may further include instructions for the computer for adding a sum of data service times and a propagation delay to the queuing delay to obtain an estimate of the data delays.

Instructions for determining a queuing delay of probes at the bottleneck link by injecting probe packets at the first location may include instructions for subtracting a sum of probe service times and a propagation delay from first location to second location probe delays. Instructions for determining a queuing delay of probes at the bottleneck link by injecting probe packets at the first location may include instructions for injecting probe packets according to a probability distribution, which includes a Poisson distribution. The system may further include instructions for determining a data packet length distribution served by the bottleneck link.

A system is provided for estimating data delays in transmitting data packets from a first location to a second location on a computer network. The system includes a computer; instructions for the computer for transmitting probe packets on the computer network according to departure statistics consistent with a stochastic process; instructions for the computer for determining probe delays for the probe packets to travel from the first location to the second location; instructions for the computer for estimating a time average from the probe delays with a prescribed accuracy; and instructions for the computer for relating the time average to the data delays. The stochastic process may include a Poisson process.

Also provided is a method of approximating a time average of a time-dependent variable, V, the variable representing a virtual delay of a packet upon arrival at a network link at a time t, including sending N probe packets to the data link; recording a time of arrival, $A_k$, where $k \leq N$, of each of the N probe packets at the data link; calculating a sum of $V(A_k)$, from $k=1$ to $k_{max}$, where $k_{max}$, and only $k_{max}$ of the N probe packets arrive at the data link before or at the time t; calculating an expectation value of a number of packets to arrive at the data link; calculating an estimator, Z(t), given by the quotient of the sum and the expectation value of a number of packets; and approximating the time average by the estimator by bounding a variance of a difference between the estimator and the time average, the variance given by an expectation value of a time average of $V(t)^2$ divided by the expectation value of a number of packets.

Also presented below is a method of approximating a time average of a time-dependent variable V, the time average given by $$\frac{1}{t}\int_0^t V(s)\,dt,$$

where V represents a virtual delay of a packet upon arrival at a network link at the time t, including sending N probe packets to the data link so that a first of the N probe packets arrives at time $A_1$, a second at time $A_2$, a third at time $A_3$, ..., and an Nth at time $A_N$, where the times $A_1 \leq A_2 \leq A_3 \leq \ldots \leq A_N$ are consistent with a Poisson process of rate $\lambda_p$; calculating an estimator Z(t), given by $$Z(t) = \frac{1}{\lambda_p t}\sum_{k=1}^{k_{max}} V(A_k)$$

where $k_{max} = \max\{k | A_k \leq t\}$; and approximating the time average by Z(t) by bounding a variance of a difference between Z(t) and the time average, the variance given by an expectation value of $$t^{-1}\int_0^t V(s)^2\,ds \div (\lambda_p t).$$

For a variable I(V(t)>x) that depends on a time t and a parameter x, a method is also presented below of approximating a time average of the variable I(V(t)>x), the variable I(V(t)>x) equal to unity if V(t), a virtual delay of a packet upon arrival at a network link at a time t, is greater than the parameter x, and equal to zero otherwise, including sending N probe packets to the data link; recording a time of arrival, $A_k$, where $1 \leq k \leq N$, of each of the N probe packets at the data link; calculating a sum of $I(A_k > x)$, from k=1 to $k_{max}$, where $k_{max}$, and only $k_{max}$, of the N probe packets arrive at the data link before or at the time t, and $I(A_k > x)$ is equal to unity if $A_k$ is greater than the parameter x, and equal to zero otherwise; calculating an expectation value of a number of packets to arrive at the data link; calculating an estimator, Z(t), given by the quotient of the sum and the expectation value of a number of packets; and approximating the time average by the estimator by bounding a variance of a difference between the estimator and the time average, the variance given by an expectation value of a time average of $I(V(t)>x)^2$ divided by the expectation value of a number of packets.

A method is also presented below of approximating a time average of a variable I(V(t)>x) that depends on a time t and a parameter x, the time average given by $$\frac{1}{t}\int_0^t I(V(t) > x)\,dt,$$

where the variable $I(V(t)>x)$ is equal to unity if $V(t)$, a virtual delay of a packet upon arrival at a network link at a time $t$, is greater than $x$, and equal to zero otherwise, including sending N probe packets to the data link so that a first of the N probe packets arrives at time $A_1$, a second at time $A_2$, a third at time $A_3$, ..., and an Nth at time $A_N$, where the times $A_1 \leq A_2 \leq A_3 \leq \ldots \leq A_N$ are consistent with a Poisson process of rate $\lambda_p$; calculating an estimator $Z(t)$, given by $$Z(t) = \frac{1}{\lambda_p t} \sum_{k=1}^{k_{max}} I(A_k > x)$$

where $k_{max} = \max\{k | A_k \leq t\}$ and $I(A_k > x)$ is equal to unity if $A_k$ is greater than the parameter $x$, and equal to zero otherwise; and approximating the time average by $Z(t)$ by bounding a variance of a difference between $Z(t)$ and the time average, the variance given by an expectation value of $$t^{-1} \int_0^t I(V(s) > x)^2 \, ds \div (\lambda_p t)$$

A method is also presented below of approximating an expectation value, $E(W^d)$, of a delay experienced by a data packet arriving at a network link, including computing a time average of a time-dependent variable, $V(t)$, the variable representing a virtual delay of a packet upon arrival at the network link at a time $t$, where the time average is given by $$\frac{1}{t}\int_0^t V(s)\,ds;$$

computing an expectation value, $E(U)$, of a packet size; computing an expectation value, $E(U^2)$, of a square of the packet size, utilizing the time average, the expectation value of a packet size, the expectation value of a square of the packet size, and a server utilization, $\rho$, to approximate the expectation value of a delay.

Utilizing the time average, the expectation value of a packet size, the expectation value of a square of the packet size, and a server utilization, $\rho$, may include utilizing the time average, the expectation value of a packet size, the expectation value of a square of the packet size, and a server utilization, $\rho$, to approximate the expectation value of a delay according to $$E(W^d) \approx \frac{1}{\rho} \frac{1}{t} \int_0^t V(s)\,ds - \frac{E(U^2)}{2E(U)}.$$

A method is also presented below of approximating an expectation value, $E(I(W^d>x))$, of a variable $I(W^d>x)$ that depends on a parameter $x$, the variable $I(W^d>x)$ equal to unity if a delay of a data packet upon arrival at a network link is greater than $x$, and equal to zero otherwise, including computing a time average of a variable $I(V(t)>x)$, the variable $I(V(t)>x)$ equal to unity if $V(t)$, a virtual delay of a packet upon arrival at the network link at a time $t$, is greater than the parameter $x$, and equal to zero otherwise.

The last method may further include approximating the expectation value according to $$E(I(W^d > x)) \approx \frac{1}{\rho t} \int_0^t I(V(s) > x)\,ds.$$

A method is also presented below of estimating data delays in transmitting data packets from a first location to a second location on a computer network including identifying a bottleneck link in a path connecting the first location to the second location; estimating a queuing delay of data from a queuing delay of probes at the bottleneck limit; and adding a sum of data service times and a propagation delay to the queuing delay to obtain an estimate of the data delays.

A system is also presented below for estimating data delays in transmitting data packets from a first location to a second location on a computer network including a computer; instructions for the computer for identifying a bottleneck link in a path connecting the first location to the second location; instructions for the computer for estimating a queuing delay of data from a queuing delay of probes at the bottleneck limit; and instructions for the computer for adding a sum of data service times and a propagation delay to the queuing delay to obtain an estimate of the data delays.

The system may further include instructions for determining a data packet length distribution served by the bottleneck link.

BRIEF DESCRIPTION OF DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF THE ILLUSTRATED EMBODIMENTS

To provide an overall understanding of the invention, certain methods, and systems will be discussed with reference to estimating data delays from Poisson probe delays. However, it will be understood by persons of ordinary skill in the art that the general methods, and systems described herein are equally applicable to all cases in which probe delays are used nontrivially to estimate data delays. Principles of the invention described below may be applied to applications in which data delays are ascertained on a computer network.

It is often assumed that probe packet queuing delay statistics (e.g., mean, cumulative distribution) are the same as data packet statistics, except for sampling error. Thus, it is widely believed, sending more probes during a measurement period would reduce any discrepancy. The following examples show that probe and data statistics may not be the same.

Figure 1:
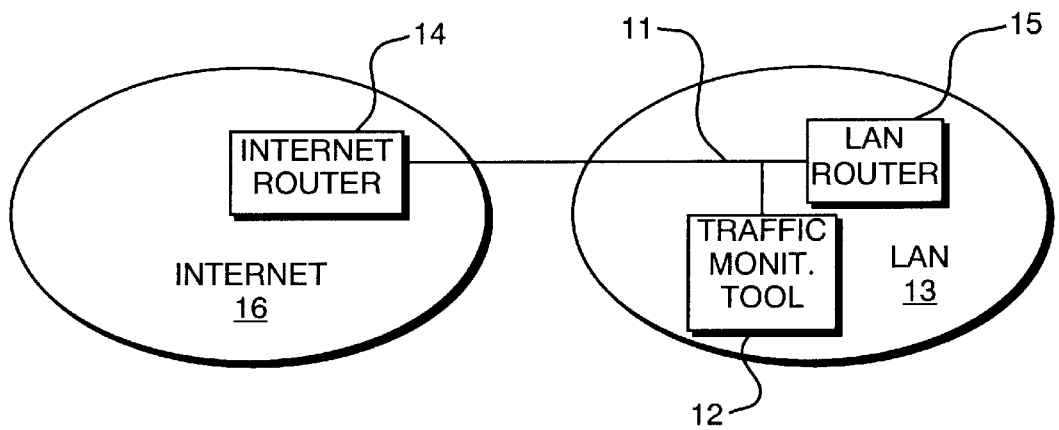
FIG. 1 illustrates an embodiment of a system for network traffic collection.

In FIG. 1, an example of an embodiment of a system for network traffic collection is shown. A monitoring point II is shown installed at a local area network (LAN) 13. A traffic monitoring tool 12 is used at this monitoring point 11 to capture Internet traffic entering and leaving the LAN 13 through a 10 Mbps link. An example of a traffic monitoring tool 12 is EtherPeek™, a commercially available software package of The AG Group, Walnut Creek, Calif., which may be run on a PC. Other traffic monitoring tools 12 may also be used. Traffic traces containing a sequence of IP packet arrival times (accurate to the microsecond), packet lengths, source and destination addresses, and protocols may be collected. A public Internet router 14 and a LAN router 15 service network traffic in the public Internet 16 and LAN 13 areas. Routers 14 and 15 are devices which forward packets between networks. The forwarding decision by routers 14 and 15 may use network layer information and routing tables, as may be constructed by routing protocols.

Downstream packets (those that enter the local area network 13) are separated from upstream packets (those that leave the local area network 13) according to packet source and destination addresses. Downstream traffic includes mainly web page downloads while upstream traffic includes mainly short request and acknowledgment packets. In an embodiment, there may be more downstream traffic (about 1.6 Mbps) than upstream (0.69 Mbps) traffic.

A router such as 14 and 15 that processes the downstream traffic together with a stream of (independent and identically distributed) exponentially spaced probes may be simulated using simulation software. In one embodiment, OPNET, a simulation package available from MIL 3 Incorporated, Washington, D.C., may be used for the simulation. Assuming that packet delays at the LAN router 15 include mainly queuing and transmission delays at the outgoing link, the analysis of packet delays at the LAN router 15 reduces to the analysis of the delays at a single queue. It may be further assumed that the outgoing link serves packets in a first-in-first-out (FIFO) order.

Figure 2:
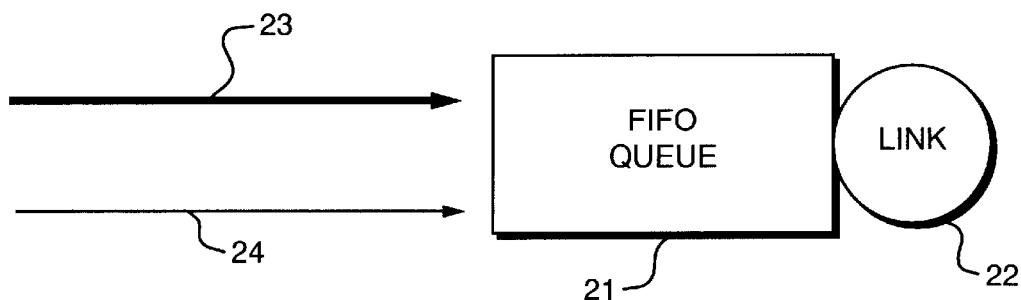
FIG. 2 illustrates an embodiment that depicts a simulation configuration.

FIG. 2 is an example of an embodiment that depicts a simulation configuration at a FIFO queue 21 that may be present at a router. The FIFO queue 21 simulates the router's outgoing link 22. Two streams feed the link 22: collected Internet traffic data packets 23 and probe packets 24. The probe packets 24 are 64 bytes long and arrive at an average rate of one probe packet per second. The service rate of the FIFO queue 21 may be varied to achieve different link utilizations.

Table 1 shows the average queuing delays, i.e., not including transmission delays, for data packets 23 and probe packets during a 20-minute measurement interval. The "percentage error" in the fourth column is defined as (Mean Probe Queuing Delay–Mean Data Queuing Delay)÷Mean Data Queuing Delay. A negative percentage error indicates that the mean probe queuing delay underestimates the mean data queuing delay. It does so consistently, by 22% to 54%.

TABLE 1

Estimating mean data queuing delays from mean probe delays

| Link Utilization | Mean Data Queuing Delay (ms) | Mean Probe Queuing Delay (ms) | Percentage Error | Computed Data Queuing (ms) | Percentage Error |
|---|---|---|---|---|---|
| 30% | 2.68 | 1.24 | −53.77% | 3.19 | 18.9% |
| 35% | 4.30 | 2.10 | −51.12% | 4.91 | 14.08 |
| 40% | 7.01 | 3.44 | −50.95% | 7.34 | 4.67% |
| 45% | 11.33 | 5.78 | −49.01% | 11.42 | 0.79% |
| 50% | 18.29 | 10.65 | −41.77% | 19.72 | 7.79% |
| 55% | 29.54 | 19.34 | −34.52% | 33.40 | 13.08 |
| 60% | 47.79 | 33.74 | −29.41% | 54.28 | 13.57 |
| 65% | 78.90 | 56.93 | −27.84% | 85.42 | 8.27% |
| 70% | 153.56 | 119.24 | −22.34% | 167.88 | 9.33% |

The observations above may be further validated with an experiment involving two computers on the Internet. Host A is at GTE Labs, Waltham, NIA and host B is at Needham, Mass. During the experiment, host A sends out user datagram protocol (UDP) packets to host B. In turn, host B simply reflects those packets back to host A. In one embodiment, the Snoop utility, available on Unix workstations, may be used at host A to measure packet round-trip delays. To minimize delays introduced by the hosts, there are no other application programs running at the hosts during the measurement period.

Host A is programmed to send out two streams of UDP packets. The first is a Poisson packet stream of rate one packet per second (the "probe" steam). The second stream (the "data" stream) contains bursts of packets. The number of packets in a burst is uniformly distributed between one and eight packets. The inter-burst arrival time is also uniformly distributed between 0 and 270 ms. All the UDP packets are 1000 bytes long.

Figure 3:
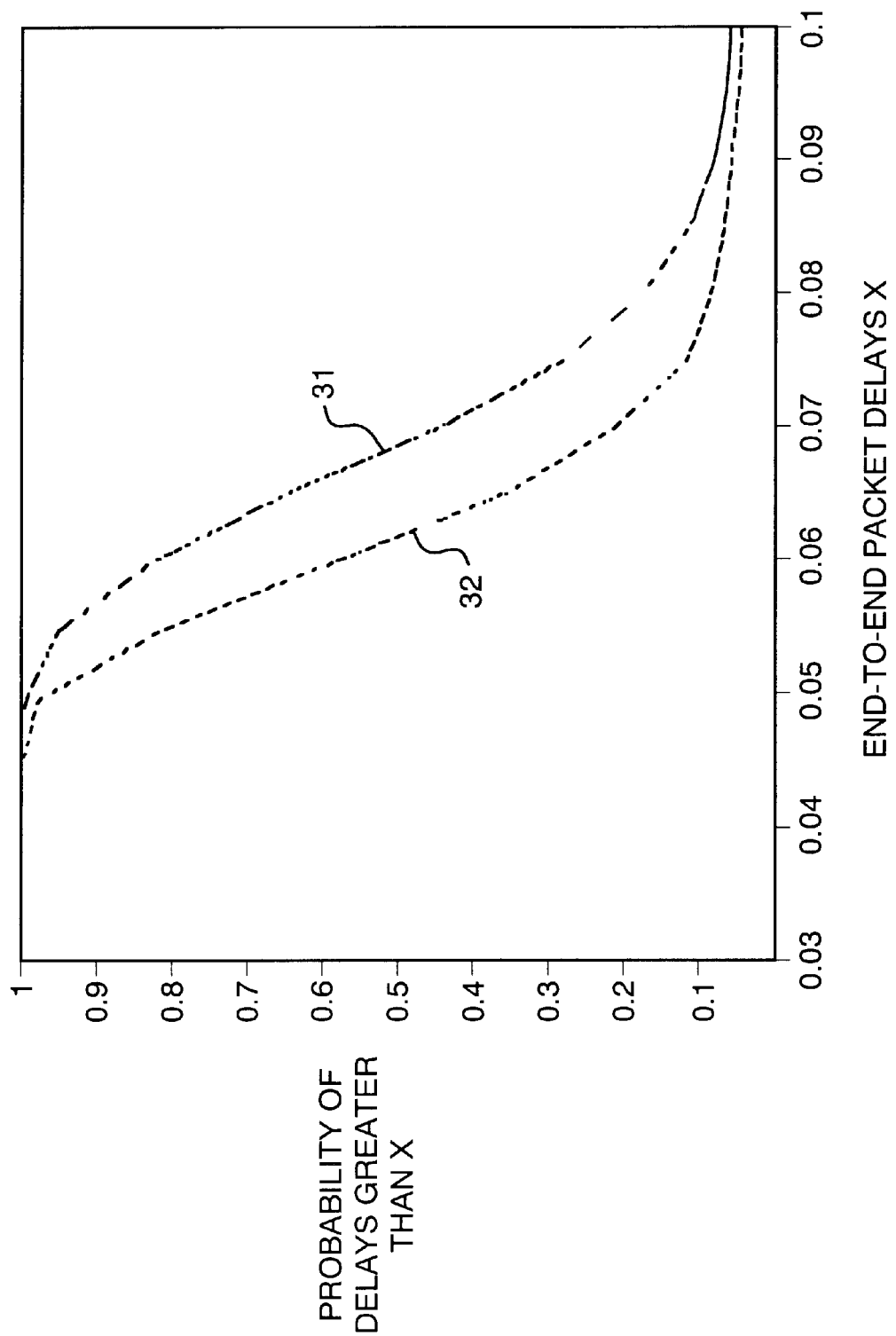
FIG. 3 illustrates a plot of user datagram protocol (UDP) packets roundtrip delay tail distributions.

In FIG. 3 is an example of a plot of user datagram protocol (UDP) packets round-trip delay tail distributions. The data stream curve 31 and the probe stream curve 32 are the probabilities of the delay being greater than a particular time versus that time for the data and probe packets respectively. Since all the UDP packets are of the same length, it may be expected that the two streams of packets have the same round-trip delay statistics. However, as can be seen by comparing curves 31 and 32, the probe stream may experience lower delays. In a particular 20-minute measurement interval, the average round trip delays are 68 ms for the probe stream and 76 ms for the data stream. These results are consistent with those of Table 1.

Discrepancies in delays between probe and data packets may be explained. Momentarily neglecting sampling error, Poisson arrivals see time averages, or "PASTA" (R. Wolff, Poisson arrivals see time averages, *Operations Research*, Vol. 30, No. 2, March–Aprril, 1982) may be invoked to assert that the mean probe delay equals the time average delay. A discrepancy then arises between the time average and the data delay. The discrepancy occurs because the bursty data arrival process does not sample the idle link as often as idleness occurs in time.

Figure 4:
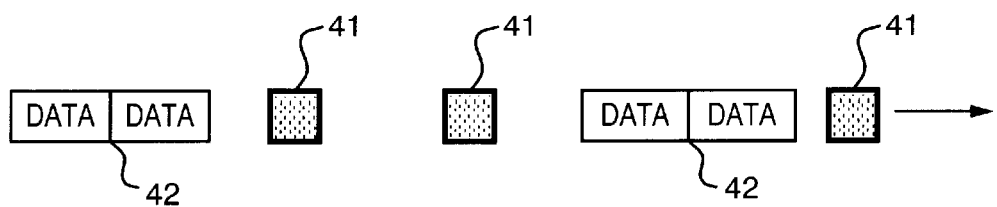
FIG. 4 illustrates showing a packet arrival process.

FIG. 4 illustrates a packet arrival process. In FIG. 4, probe packets 41 are of small constant length and arrive according to a Poisson process. Data packets 42 come in pairs and both packets are of the same constant length. Each utilizes r units of service time. The time between successive arrivals of pairs is a fixed quantity T and $\rho=2r/T$ is the link utilization, assumed to be less than one.

Ignoring the effect of probes, the first packet of a pair does not wait for service, while the second packet has to wait r units of time before being transmitted. The average data packet queuing delay is then 0.5 r regardless of the link utilization.

In addition, by PASTA, a fraction 1-ρ of probe packets incurs no delay, while a fraction of probes experiences an average of r units of queuing delay, making the average probe delay ρr. The ratio of mean probe delay to mean data delay is 2ρ. The ratio ranges from 0 to 2, so probe delays can be larger or smaller than data delays.

In accordance with principles of the present invention, data delays are estimated by (1) approximating the time average by the sample statistics and (2) approximating data packet statistics by time averages. The second step is independent of the way the time average is estimated and so applies to exponential, periodic, or another technique that gives an estimate of the time average.

A router is modeled in an IP network. The outgoing link is the bottleneck in the router: packet delays at the router mainly include queuing and transmission delays at the outgoing link. Delays in other parts of the router, e.g., routing table lookups, are negligible. Service on the link is first-in first-out (FIFO). The router is represented by a single server FIFO queue with effectively infinite waiting room (effectively infinite because loss behavior is not studied). The queue receives two packet streams, data and probes, and, except where noted below, the notation refers to the aggregate stream. The following notation is used below.

- V(s) is the virtual delay at the link at time s, i.e., the delay an arrival at time s would see or the total number of bits in a queue at time s (including the bits of the packet in service) divided by the link speed.
- $T_n$ is the time between packet arrivals n and n+1. Packets include data and probes.
- $A_n$ is the time when the nth packet arrives. A(t) is the total number of packets that arrive in the interval [0,t].
- $U_n$ is the size (in seconds) of the nth packet to arrive.
- $W_n$ is the delay that the nth arrival sees, i.e., the virtual delay at the arrival time, which does not include $U_n$.
- N(t) is the number of probes that arrive in the interval [0,t]. We assume N is a Poisson process with rate $\lambda_p$. Probe packets are of constant size.

The following assumptions may be made below.

Assumption 1. A(t)/t converges almost surely to a limit λ as t →∞,

Assumption 2. For each n, the packet service $U_n$ is independent of $\{U_k, T_k : k<n\}$ and the $U_n$ are identically distributed.

Assumption 3. The sequence $\{(T_n, U_n)\}$ is stationary and ergodic.

The actual delay process $\{W_n : n \geq 0\}$ evolves according to Lindley's equation (S. Asmussen, *Applied Probability and Queues*, New York: John Wiley & Sons, 1987):

$$W_{n+1} = (W_n + U_n - T_n)^+.$$

Also, $W_n = V(A_n-)$ and V increases by the amount $U_n$ at time $A_n$ and decreases with slope -1 on each interval $[A_n, A_{n+1}]$ while V ≧ 0. Whenever V becomes zero, it stops decreasing and remains at zero until the next increase.

The difference between the delays that the probes sample and the corresponding time average delays may be analyzed. Some of the results presented below may not require Assumptions 1, 2, or 3. Let f be a bounded, measurable function and U(s)=f(V(s)). Two examples are f(v)=v (when estimating means; to make f bounded, it may be truncated, for example, at the buffer size) and f(v)=I(v>x) (when estimating tails), where I is an indicator function (1 if its argument is true, and 0 otherwise). It may be assumed that U has left continuous sample paths and right-hand limits (R. Wolff, 1982). Wolff's Lack of Anticipation Assumption (LAA) may also be assumed: For each s>0,{N(s+u)−N(s) :u≧0} and {U(x): 0≦x≦s} are independent.

The quantities Y(t), and Z(t), may be defined as follows:

$$Y(t) = \int_0^t U(s) \, dN(s)$$

and $$Z(t) = \frac{Y(t)}{E(N(t))} = \frac{Y(t)}{\lambda_p t}.$$

By the left continuity of U, Y(t) is the sum of the values of U immediately before the probe arrival epochs. The mean of N(t) instead of N(t) itself appears in the denominator of Z(t). This choice makes the analysis of the variance tractable and avoids the event {N(t)=0}.

Probe measurements over the time interval [0,t] provide the estimator Z(t), while the time average is the random variable (not a constant, as in traditional sampling)

$$\frac{1}{t} \int_0^t U(s) \, ds$$

For example, when f(v)=v, the time average is the virtual delay averaged over the measurement interval (0,t). When f(v)=I(v>x), the time average is the fraction of time the virtual delay exceeds x.

The quantity R(t) may be defined as $$R(t) = Y(t) - \lambda_p \int_0^t U(s) \, ds = \int_0^t U(s)(dN(s) - \lambda_p ds)$$

(R. Wolff, 1982). It then follows that:

$$\frac{R(t)}{\lambda_p t} = Z(t) - \frac{1}{t} \int_0^t U(s) \, ds$$

measures the difference between the estimator and the time average. By Eq.(3) of the last reference, E(R(t))=0, i.e., the estimator Z(t) is unbiased. The orthogonal increments property (D. Williams, *Probability with Martingales*, Cambridge, Cambridge University Press, 1991, Chapter 12) of the martingale N(s)−$\lambda_p$s may be used to calculate the variance R(t).

Lemma: Under LAA, $$\text{Var } R(t) = \lambda_p E \left[ \int_0^t U(s)^2 \, ds \right].$$

Proof. For integral n>0, define $$R_n(t) = \sum_{k=0}^{n-1} U(kt/n)[N((k+1)t/n) - N(kt/n) - \lambda_p t/n]$$

Then $R_n(t) \to R(t)$ pointwise and when f is bounded by a constant M, $R_n(t)$ is bounded by the function MN(t), which is square integrable. By dominated convergence, $$Var\, R(t) = E[R(t)^2] = \lim_{n \to \infty} E[R_n(t)^2].$$

Write $$R_n(t)^2 = \sum_{k=0}^{n-1} U(kt/n)^2 [N((k+1)t/n) - N(kt/n) - \lambda_p t/n]^2 + S$$

where the sum on the right has two parts: the "diagonal" terms of the square, and S, the sum of n(n−1) "off-diagonal" terms. The expectation of a typical summand in S takes the form $$E\{U(jt/n)U(kt/n)(N((j+1)t/n)-N(kt/n)-\lambda_p t/n)\} \times E\{N((k+1)t/n)-N(kt/n)-\lambda_p t/n\}=0$$

where j<k. The expectation of the product of the four terms is the product of the expectations shown above by the LAA and the independent increments property of the Poisson process. The right-hand expectation is zero since the Poisson process N has rate $\lambda_p$. Thus, E(S)=0. Using LAA and $E[N((k+1)t/n)-N(kt/n)-\lambda_p t/n]^2 = \lambda_p t/n$ on the diagonal terms, $$E[R_n(t)^2] = \lambda_p E\left[\sum_{k=0}^{n-1} U(kt/n)^2 t/n\right].$$

Dominated convergence gives the result. (See also, D. D. Yao, On Wolff's PASTA Martingale, Operations Research, Vol. 40, 1992).

By the lemma, $$Var \frac{R(t)}{\lambda_p t} = \frac{1}{\lambda_p t} E\left[t^{-1} \int_0^t U(s)^2 ds\right].$$

The independent increments property of the Poisson may be used as a simplifying property. Under exponential sampling, the variance is the same as it may be if the samples were independent. If the sampling does not affect the observed process, then U remains the same as $\lambda_p$ is changed. Var R(t)/($\lambda_p$t) then decreases inversely in $\lambda_p$t. In practice, this may be achieved by not sampling too often.

EXAMPLE 1

Let f(v)=I(v>x). Then $U(s)=I(V(s)>x)=U(s)^2$. Assuming V is stationary, $$Var \frac{R(t)}{\lambda_p t} = \frac{P(V > x)}{\lambda_p t}$$

With an a priori bound on P(V>x), the variance can be bounded.

EXAMPLE 2

When f(v)=v (or a truncated version) and V is stationary.

$$Var \frac{R(t)}{\lambda_p t} = \frac{1}{\lambda_p t} E[V^2].$$

For example, if V<0.5 and $\lambda_p t \approx 1000$, then the variance is at most 0.00025.

Having just quantified the discrepancy between the ensemble and time averages of the probe delays by approximating the variance of R(t)/($\lambda_p$t), the time average is now approximated to the ensemble average of data delays. By association, a relationship between probe and data delays will thus be obtained.

The two averages $$\frac{1}{t}\int_0^t V(s)ds \text{ and } \frac{1}{A(t)} \sum_{n=0}^{A(t)} W_n$$

are related asymptotically by generalizations of Little's law (S. Brumelle, On the relation between customer and time averages in queues, *J Appl Prob.*, Vol. 8, 1971; S. Asmussen, *Applied Probability and Queues,* New York: John Wiley & Sons, 1987, VIII.3.4).

Figure 5:
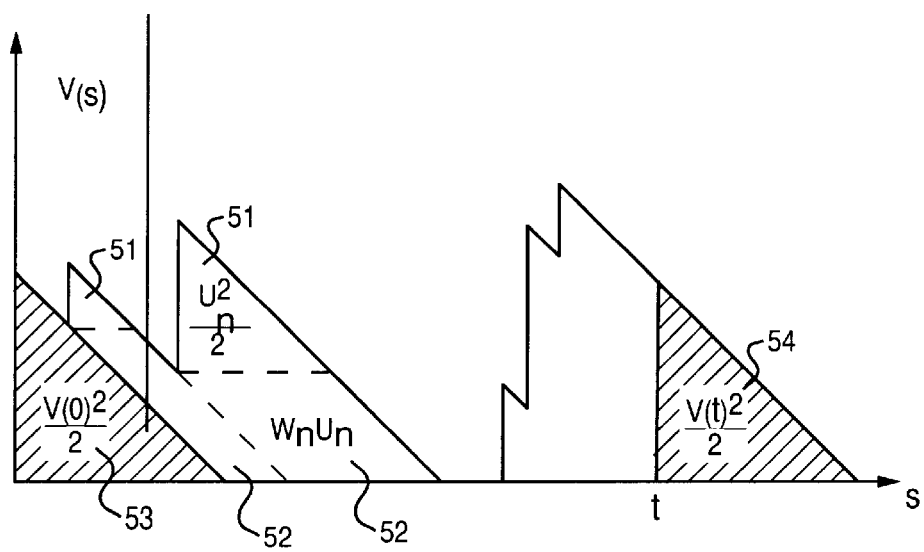
FIG. 5 illustrates a plot relating the virtual and actual mean delays.

In FIG. 5 appears an example of a plot relating the virtual and actual mean delays. The area under V on the interval [0,t] is divided into right triangles of height $U_n$ 51 and parallelograms of height $W_n$ and base $U_n$ 52 (S. Asmussen, 1987). An error $V(0)^2/2$ 53, and another error $V(t)^2/2$ 54 occur at both the left and right endpoints, respectively, leading to the expression $$\int_0^t V(s)ds - V(0)^2/2 = \sum_{n=1}^{A(t)} [U_n^2/2 + W_n U_n] - V(t)^2/2$$

By Assumption 3, the error terms are o(t) (S. Asmussen, 1987). Hence, by applying Assumptions 1 and 3, $$\frac{1}{t}\int_0^t V(s)ds \approx \frac{A(t)}{t} \frac{1}{A(t)} \sum_{n=1}^{A(t)} [U_n^2/2 + W_n U_n] \to$$

$$\lambda E[U^2/2 + UW], \text{ as } t \to \infty$$

where the expectations of random variables without subscripts correspond to limiting distributions (R. M. Loynes, The stability of a queue with non-independent inter-arrival and service times, *Proc. Camb. Philos. Soc.,* Vol. 58, 1962). By Assumption 2, $$\frac{1}{t}\int_0^t V(s)ds \approx \lambda[E(U^2)/2 + E(U)E(W)] = \rho[E(U^2)/(2E(U)) + E(W)]$$

for large t, where $\rho = \lambda E(U)$ is the server utilization. Then $$E(W) \approx \frac{1}{\rho}\frac{1}{t}\int_0^t V(s)ds - \frac{E(U^2)}{2E(U)}. \quad (1)$$

The probe packet rate may be much smaller than the data packet rate so that probe packets do not consume too many resources, such as computer time. Assuming that the mean data rate satisfies $\lambda_d \gg \lambda_p$, it follows that $E(W) = \lambda_d/\lambda E(W^d) + \lambda_p/\lambda E(W^p) \approx E(W^d)$, so the preceding expression is approximately the mean data delay. Here, the superscripts d and p signify data and probes, respectively.

Instead of the mean delay, delay tails may be examined. The development parallels that in the preceding paragraph.

Figure 6:
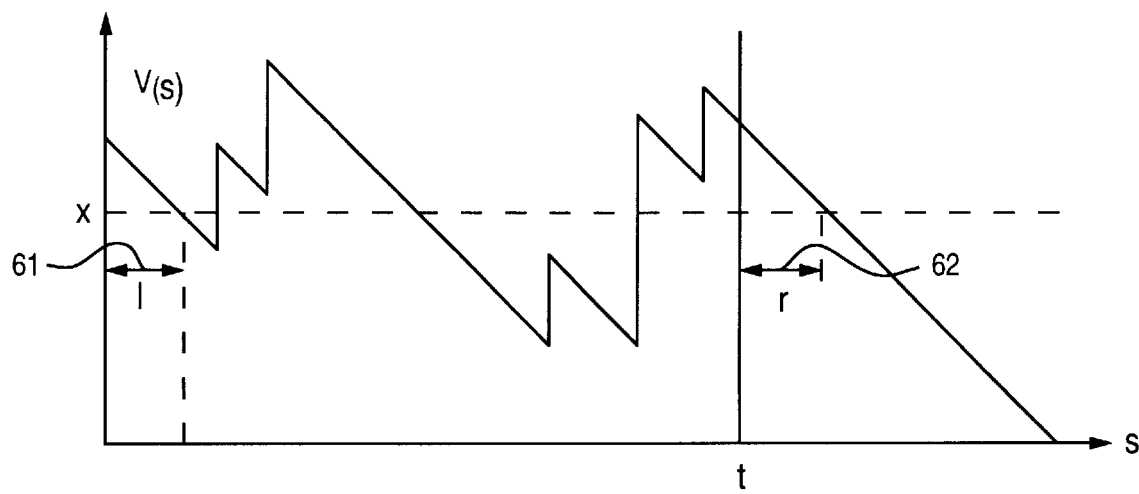
FIG. 6 illustrates a plot relating the virtual and actual delay tails.

FIG. 6 illustrates a sample path of V. The fraction of $W_n$, that exceeds the level x during the interval [0,t] is of interest. The starting expression is $$\int_0^t I(V(s) > x)\,ds + r = \sum_{n=0}^{A(t)} I_n + l.$$

Here, $l=[A_1-(x-W_1)^+]^+$ and $r=[(W_{A(t)}+U_{A(t)}-x)^+-(t-A_{A(t)})]^+$ are the left-hand error 61 and right-hand error 62 in FIG. 6. $I_n$ is the contribution of the nth arrival to the integral on the left-hand side:

$$I_n = \begin{cases} U_n & \text{if } W_n \geq x \\ W_n + U_n - x & \text{if } W_n < x < W_n + U_n \\ 0 & \text{if } W_n + U_n \leq x \end{cases}$$

or $$I_n = U_n I(W_n \geq x) + (W_n + U_n 31\ x) I(W_n \leq x < W_n + U_n).$$

The error terms are again o(t); using Assumptions 1 and 3, it may be seen that $$\frac{1}{t}\int_0^t I(V(s) > x)\,ds \to P(V > x) \quad \text{and} \quad \frac{A(t)}{t}\frac{1}{A(t)}\sum_{n=0}^{A(t)} I_n \to \lambda E(I)$$

where $P(V>x)=\lambda E(I)$ is the limit. The calculation of $E(I)$ may be broken up into two steps.

Lemma 1. Under Assumption 2, $$E(U_n I(W_n \geq x)) = E(U_n) P(W_n > x).$$

Proof. Assumption 2 implies that $U_n$ and $W_n$ are independent.

For the next result, the so-called residual or excess lifetime associated with the random variable $U_n$ may be used. Wherever convenient, the subscript n is omitted. If B is the distribution function of $U_n$, then the residual lifetime of $U^*$ has distribution function $$P(U^* \leq t) = \frac{1}{E(U)}\int_0^t (1 - B(u))\,du.$$

Lemma 2. Under Assumption 2, $$E[(W_n+U_n-x)I(W_n \leq x < W_n+U_n)] = E(U)P(W \leq x < W+U^*).$$

Proof. Recalling that subscripts have been omitted, for $w \leq x$, the conditional expectation $$E[(W+U-x)I(W \leq x < W+U)\mid W=w] =$$

$$E[(U+w-x)I(U+w-x > 0)] = \int_{x-w}^\infty (u+w-x)\,dB(u) =$$

$$\int_{x-w}^\infty (1-B(u))\,du = E(U)P(U^* > x-w)$$

The third line results from integration by parts. The result follows.

Proposition. Assume that the $U_n$ are bounded above by a constant m and that Assumption 2 holds. Then $$\rho^{-1}P(V>x+m) \leq P(W>x) \leq \rho^{-1}P(V>x).$$

Proof. By the two lemmas, $P(V>x)=\rho P(W+U^*>x) \geq \rho P(W>x)$. Since $$U^* \leq m,\ \rho P(W>x) \leq P(V>x) \leq \rho P(W>x-m).$$

The result follows by using both inequalities.

This result allows the estimation of the tails of the distribution of W in terms of the tail of V. As in the preceding section, the distribution of W represents the data packet delay distribution, since probe traffic is relatively negligible. The tail of W is confined to an interval of length at most $\rho^{-1}P(x<V<x+m)$. If x is large compared to m, then it may be expected that $\rho^{-1}P(x<V<x+m)$, and $|P(V>x)-\rho P(W>x)|$, which is less than or equal to $P(x<V<x+m)$, are small.

As an example, suppose V has an exponential tail or an exponential bound (as provided by large deviations, for example): $P(V>x)=e^{-\alpha x}$. Then $$P(x<V<x+m)=e^{-\alpha x}(1-e^{-\alpha m})\approx e^{-\alpha x}\alpha m$$

The relative error in the estimates is then $$\frac{P(x<V<x+m)}{P(x<V)} = 1 - e^{-\alpha x} \approx \alpha m.$$

Suppose that an overflow from a buffer size x is to be made improbable: $P(V>x)=e^{-\alpha x}=\epsilon \ll 1$.
Then $\alpha x = \log(1/\epsilon)$, and the relative error is approximately $$\alpha m = mx^{-1}\log(1/\epsilon)$$

For example, if $\epsilon=10^{-6}$, then $\log 1/\epsilon \approx 14$ and the relative error becomes $14m/x$. On the other hand, if $\epsilon=10^{-2}$, then $\log(1/\epsilon)\approx 5$. If the buffer can hold 100 maximal size packets, the error in the latter case is at most 5%.

The use of the above approximations, along with the errors committed in estimating tail probabilities, is now discussed. During a measurement interval [0,t], N(t) probe delay measurements are collected, and the estimator $$Z(t) = \frac{1}{\lambda_p t}\int_0^t I(V(s) > x)\,dN(s)$$

is formed. By using an estimate, Z(t) may be related to the fraction of data packets whose delay exceeds x; part of the error in the estimate may be controlled through intermediate approximations:

$$Z(t) \approx \frac{1}{t}\int_0^t I(V(s) > x)\,ds$$

$$\approx P(V > x)$$

$$\approx \rho P(W > x) + \rho P(W \leq x < W + U^*)$$

$$\approx \frac{\rho}{A(t)}\sum_{n=1}^{A(t)} I(W_n > x) + \rho P(W \leq x < W + U^*)$$

$$\approx \frac{\rho}{A(t)}\sum_{n=1}^{A(t)} I(W_n > x)$$

By selecting a high enough sampling rate $\lambda_p$, both sides of the first approximation may be made small in the mean square sense (i.e., the variance). The second and fourth approximate equalities correspond to almost sure pointwise limits in the ergodic theorem; the quality of these approximations cannot be controlled, Nor may the error in the third approximate equality, which results from Assumption 2, be controlled. What may be controlled is the accuracy of the last approximation by showing that $\rho P(W \leq x < W+U^*)$ is small, as above. The final source of error comes from assuming that probes have a negligible effect (e.g., $W=W^d$). This may be controlled if the data arrival rate $\lambda_d$ is known.

Assuming probes have a negligible effect also yields $P(W>x)=E(I(W^d>x))$.

The mean data packet delay predicted by Eq. (1) may be compared to the simulation results in Table 1. The column labeled "Computed Data Queuing" is the result of substituting the mean probe queuing delay for the time average in Eq. (1). Using these values in accordance with principles of the current invention, instead of the mean probe queuing delays as estimators, reduces the errors. When the link utilization is above 50%, the estimator is at most 15% above the true value. In comparison, the mean probe queuing delay ranges from 20% to 40% below the true values.

The packet service times in some traces may be correlated, so Assumption 2 does not hold. Nonetheless, our methods give good agreement with the simulation results. In particular, if the packet sizes, and the $U_n$ are constant, then the same results would follow as with independence. Files transferred across the Internet are typically segmented into some number of "maximum segment size" packets (of equal size) plus a remainder packet, so the constant size assumption may be reasonable.

Figure 7:
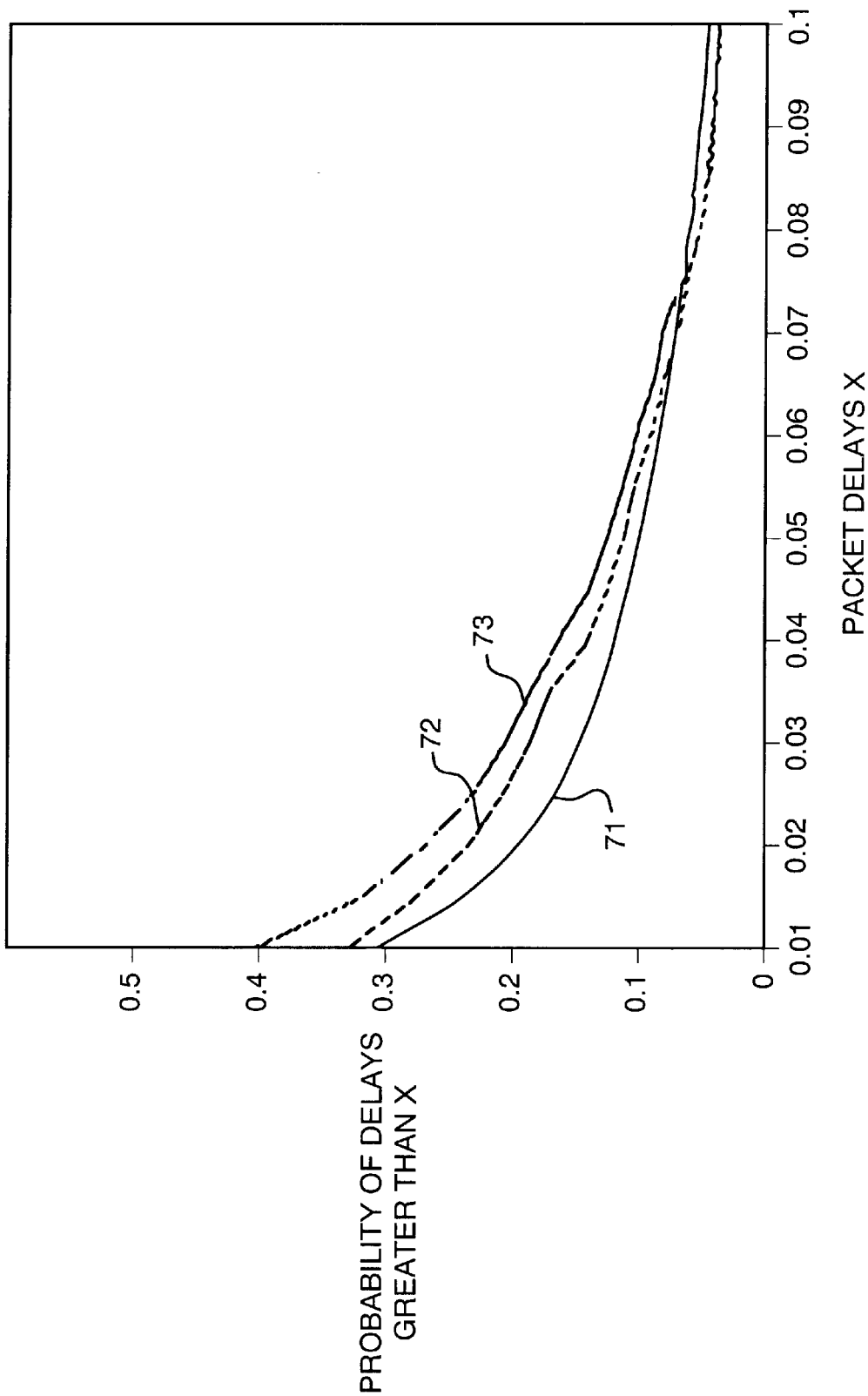
FIG. 7 illustrates a plot showing the data queuing delay tail estimation.

FIG. 7 shows the estimated delay tail distribution in relation to the bounds described by Equation (2). The solid curve is the data packet delay curve 71, the dashed curve the estimated lower bound curve 72, and the remaining curve the estimated upper bound curve 73. For the same reasons listed above, the data packet distribution does not fit Equation (2) exactly. The bounds are, however, close to the real data queuing delay distribution.

Extending the single node, one queue results discussed above to networks having multiple nodes may now be set forth in the following paragraphs. Probe packets pass through a sequence of nodes along their path through the network. The first effect of multiple nodes is to eliminate the conditions that PASTA requires. Even if probes arrive in a Poisson stream to the first node along the path, their arrivals to subsequent nodes may not be Poissonian. To see this explicitly, denote by $\tau_n$ the time when the nth probe packet arrives to the first node. Then the nth probe will arrive at the second node at time $$\tau_n+V(\tau_n)+d,$$

where V is the virtual delay function at the first node and d is the propagation delay between nodes 1 and 2. A similar relationship holds between the probe arrival times at any pairs of adjacent nodes. If the $V(\tau_n)$ are not constant, then the process $\tau_n+V(\tau_n)+d$ might not be Poissonian.

In contrast, adding a constant offset to a Poisson process preserves the Poisson property. If it is assumed that a single bottleneck node occurs along the probe's path, and that packets experience essentially no delay at nodes other than the bottleneck, $V(\tau_n)$ equals the probe service time, which is constant. The same holds true at other non-bottleneck nodes. Thus, the probes arrive in a Poisson stream to the bottleneck.

Another consequence of passing probes through nodes in tandem is that LAA may fail. In addition, the service times $U_n$ and the waiting times $W_n$ are negatively correlated—not independent—at nodes other than the first (R. Wolff, 1982). As a result, Assumption 2 cannot hold and Lemma 1 becomes $E(U_n I(W_n \geq x)) \leq E(U_n)P(W_n>x)$.

Multiple nodes may also lead one to account for propagation delays and service times at all the nodes. Suppose the path the probes follow traverses n links, with transmission speeds $c_1, \ldots, c_n$, and that the total propagation delay is D. The sum of the link service times of a packet of length x is $\gamma x$, where $\gamma=1/c_1+\ldots+1/c_n$. Consider a typical probe packet of length $L^p$ (subscripts are omitted in the following). It experiences an end-to-end delay $$W_{ee}^p=V+\gamma L^p+D,$$

where V is the probe delay at the bottleneck node and no delays at other nodes are assumed. The notation V intentionally suggests that the probes see time averages. Similarly, a data packet's end-to-end delay may be given by $$W_{ee}^d=W+\gamma L^d+D,$$

where W is its delay at the bottleneck node.

Probe measurements give the distribution Of $W_{ee}^p$. Given $\gamma$, the distribution of V may be obtained because $\gamma L^p+D$ is a constant, as a result of the fixed probe size. The results above then give the distribution of W. If $L^d$ were not random, the distribution $W_{ee}^d$ would be known. If $\gamma$ is large (i.e., some link other than the bottleneck is slow), $W_{ee}^d-D=W+\gamma L^d$ is the sum of two random variables, which may be comparable in size. In this case, the service time may be separated out at the bottleneck and Assumption 2 invoked again. The distribution of the sum is then a convolution, which may be calculated numerically. If the bottleneck is significantly slower than all the other links, $L^d$ may be replaced with its mean or a percentile, incurring a small error.

Estimating end-to-end mean data packet delays is similar. Equation (1) may be invoked to pass from E(V) to E(W). Then $$E(W_{ee}^d)=E(W)+\gamma E(L^d)+D \tag{3}$$

Knowledge of $E(L^d)$, together with other principles consistent with the present invention, may be used to calculate $E(W_{ee}^d)$.

An end-to-end delay analysis may require knowledge of link speeds, the data packet length distribution, and the bottleneck link utilization $\rho$. To the extent that any of these may be unavailable, they may have to be replaced by approximations. Effects such as these may require approximations to be validated on real or simulated networks.

Figure 8:
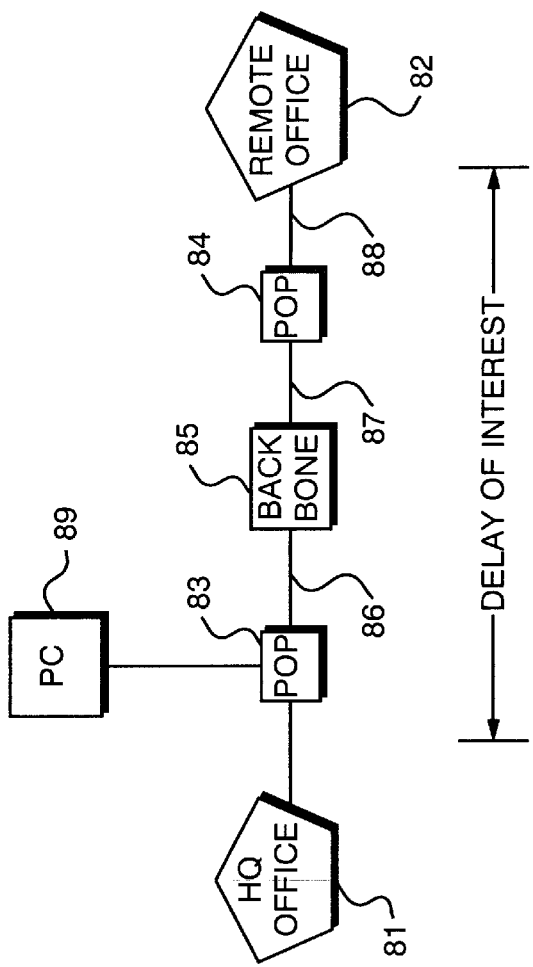
FIG. 8 illustrates an embodiment of a network depicting the delay of interest.

Referring to FIG. 8, an ISP may provide one of its business customers with Virtual Private Network (VPN) services that connect the customer's headquarters office 81 to a remote office 82. The headquarters office 81 is connected to the ISP via the headquarters office point of presence (POP) router 83 and the remote office 82 is connected to the ISP via the remote office POP router 84. These two routers are connected by an ISP backbone router 85.

Suppose that the ISP is interested in estimating the one-way data packet delay from the headquarters office POP router 83 to the remote office POP router 84. Probes heading to the remote office 82 may be generated on a PC 89, injected into the headquarters office POP router 83, and captured at the output of the remote office POP router 84. Assuming that clocks are properly synchronized, the end-to-end probe delays may be measured correctly.

To apply the theories developed in the previous sections to estimate data packet delays from the probe end-to-end delays, the ISP may need to first identify the bottleneck link. The ISP already knows the bandwidth of a left link 86, middle link 87, and right link 88 in FIG. 8. The link utilization during the period of interest may be obtained from simple network management protocol (SNMP) management information bases (MIB) on the routers. Suppose that during the period of interest, the right link 88 has a much higher utilization than either the left link 86 or middle link 87, and hence is the bottleneck link. Next, the ISP may need to know the data packet length distribution served by the bottleneck link during the period of interest. It may be estimated through sampling, or by past experience.

Figure 9:
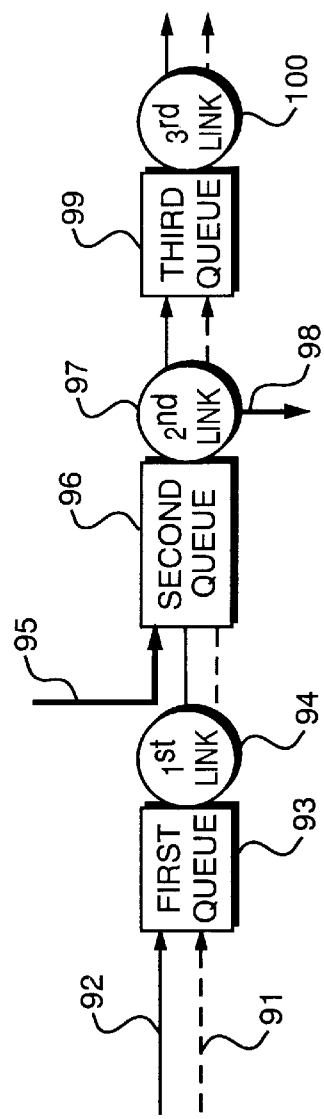
FIG. 9 illustrates depicting a queuing model.

FIG. 9 is an example depicting a queuing model that may be subjected to the principles consistent with the present invention to determine queuing delays. A queuing model of the path with a first 93, second 96, and third 99 queue, and a first 94, second 97, and third 100 link is shown. The three queues may model the three router output links respectively. A probe stream 91 carries packets that are launched according to a Poisson distribution of average rate one probe per second. The probe packets are 64 bytes long. In addition, there are two traffic streams. First queue stream 92 represents the traffic sent from the headquarters to the remote office. It enters the network at the first queue, passes through the queues in sequence and leaves the network after being processed by the third queue. The second queue arrival 95 and departure 98 streams represent all other traffic carried by the backbone link. It enters the network at the second queue 96 and leaves the network immediately after being processed by that queue.

As an example, two traffic traces collected at a facility may be used as the two data input streams and a simulation may be conducted. The service rates of the first queue 93 and second queue 96 are chosen such that the first queue 93 has 10% utilization and the second queue 96 has 5% utilization. The service rate of the third queue 99 may be varied so that its utilization ranges from 30% to 60%. As a result, the third queue 99 is the bottleneck in all the cases.

The end-to-end delays for probes, i.e., $W_{ee}^P$, during the 20-minute period are collected from the simulation. The mean probe queuing delay may be estimated at the bottleneck queue by subtracting the sum of the probe service times at the three queues and the propagation delay from the mean end-to-end probe delay. Equation (1) may then be applied to estimate the mean data queuing delays at the bottleneck queue. Finally, as in Equation (3), the sun of the mean data service time at the three queues and the propagation delay may be added to the estimated data queuing time at the bottleneck queue to get the mean end-to-end data packet delay.

Figure 10:
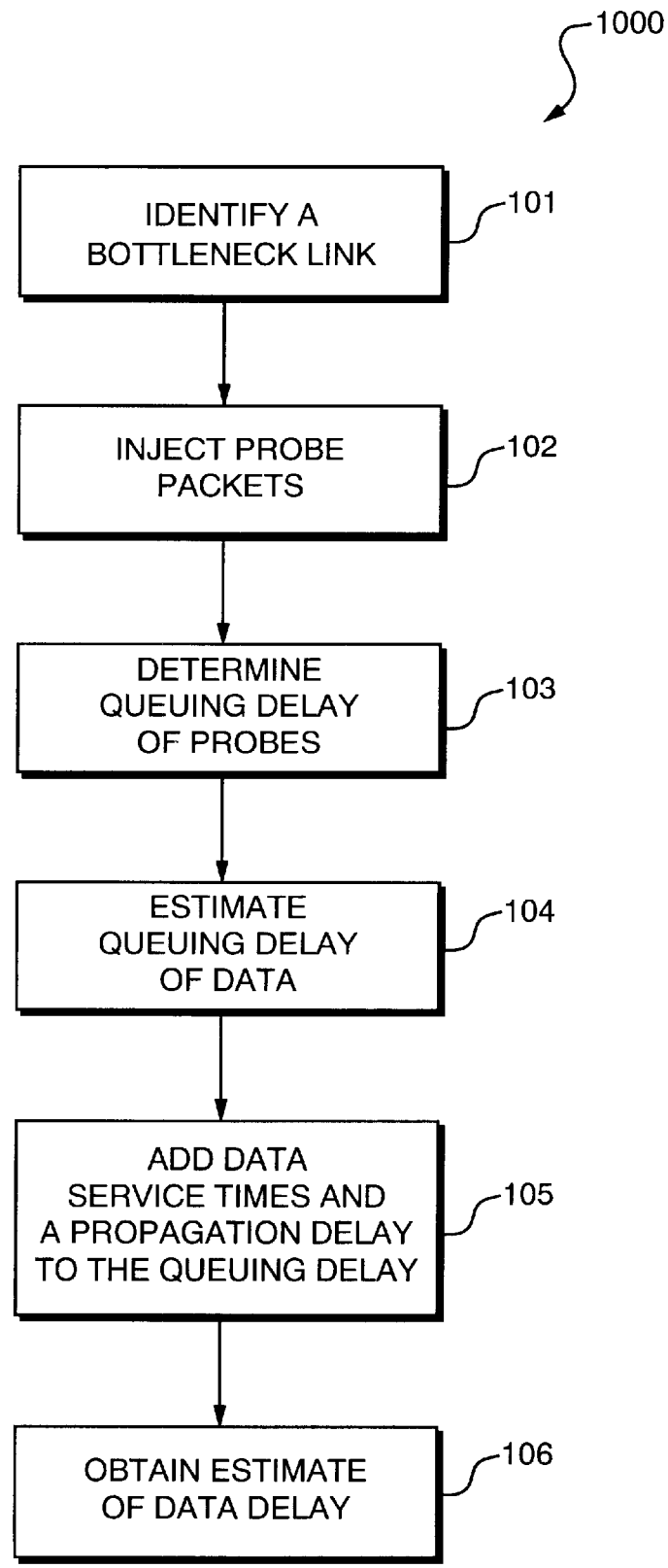
FIG. 10 illustrates a flow chart summarizing the steps involved in obtaining data delays from probe delays.

FIG. 10 is a flow chart (1000) summarizing the steps involved in estimating data delays from probe delays. In step 101, a bottleneck is identified in the path leading from a first location to a second location—in the example above, from the headquarters office to the remote office. Network operators may identify the bottleneck link by inspecting link statistics collected by routers. End users may identify the bottleneck link by using the "packet pair" mechanism, as described in S. Keshav, "A control-theoretic approach to flow control," Proc. SIGCOMM 1991, and R. L. Carter and M. E. Crovella, "Measuring bottleneck link speed in packet-switched networks," Rept. BU-CS-96-006, Boston University, Mar. 15, 1996. In step 102, probe packets are generated according to Poisson statistics at a PC or Unix workstation, for example, and injected into the network for delivery to the second location. Standard networking utilities on the PC or workstation may be used to inject the packets into the network. In step 103, the mean queuing delay of the probe packets is determined. Equation (1) may then be used in step 104 to estimate the mean queuing delay of data from the mean queuing delay of probes. Finally, in steps 105 and 106, an estimate of the data delay is obtained, by adding the mean data service times and the propagation delay to the mean queuing delay, according to Eq. (3).

In one embodiment, steps 102 and 103 may be implemented in C, and steps 104 and 105 in Matlab, C, or C++.

Table 2 shows the results and compares them with the mean end-to-end data delays collected directly from the simulation. Again, high estimation errors result if one used the mean probe end-to-end delay directly to estimate the mean data end-to-end delay. On the other hand, the approach described above produces results that are quite close to the mean data end-to-end delay collected directly from the simulation.

TABLE 2

End-to-end data packet delay estimation. E-E: End-to-End

| Link Utilization | Mean Data E-E Delay (ms) | Mean Probe E-E Delay (ms) | Percentage Error | Computed E-E Delay (ms) | Percentage Error |
|---|---|---|---|---|---|
| 30% | 4.20 | 1.60 | −61.90% | 4.72 | 12.29% |
| 40% | 8.90 | 3.90 | −56.18% | 8.82 | −0.95% |
| 50% | 20.50 | 11.20 | −45.37% | 21.14 | 3.10% |
| 60% | 50.30 | 34.40 | −31.61% | 55.70 | 10.74 |

Figure 11:
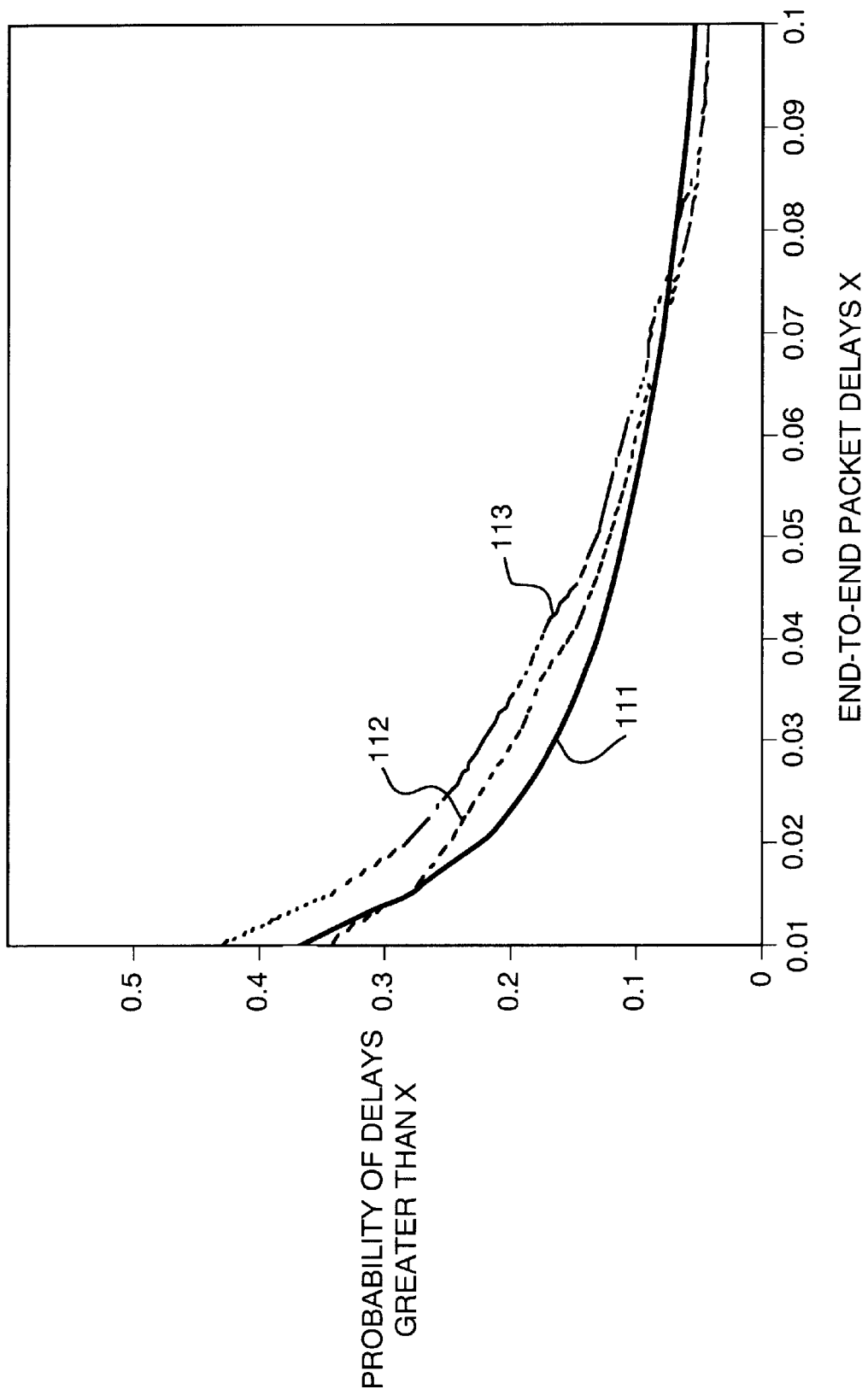
FIG. 11 illustrates a plot of end-to-end data delay tails.

To estimate the end-to-end data delay tails, $L^d$ may be replaced with its mean as described above. FIG. 11 shows the end-to-end data delay tail estimation when the bottleneck link is 50%. The solid curve represents the data packet delay curve 111, the dashed curve 112 the estimated lower bound curve 112, and the remaining curve the estimated upper bound curve 113. The bounds are reasonably close to the real data delay.

In this example, the ISP knows the bandwidth and utilization for all the links within its network. If, however, a business customer wishes to estimate the end-to-end delay, the link utilization information may be used from either the ISP or by making approximations, for example, through using various tools.

Figure 12:
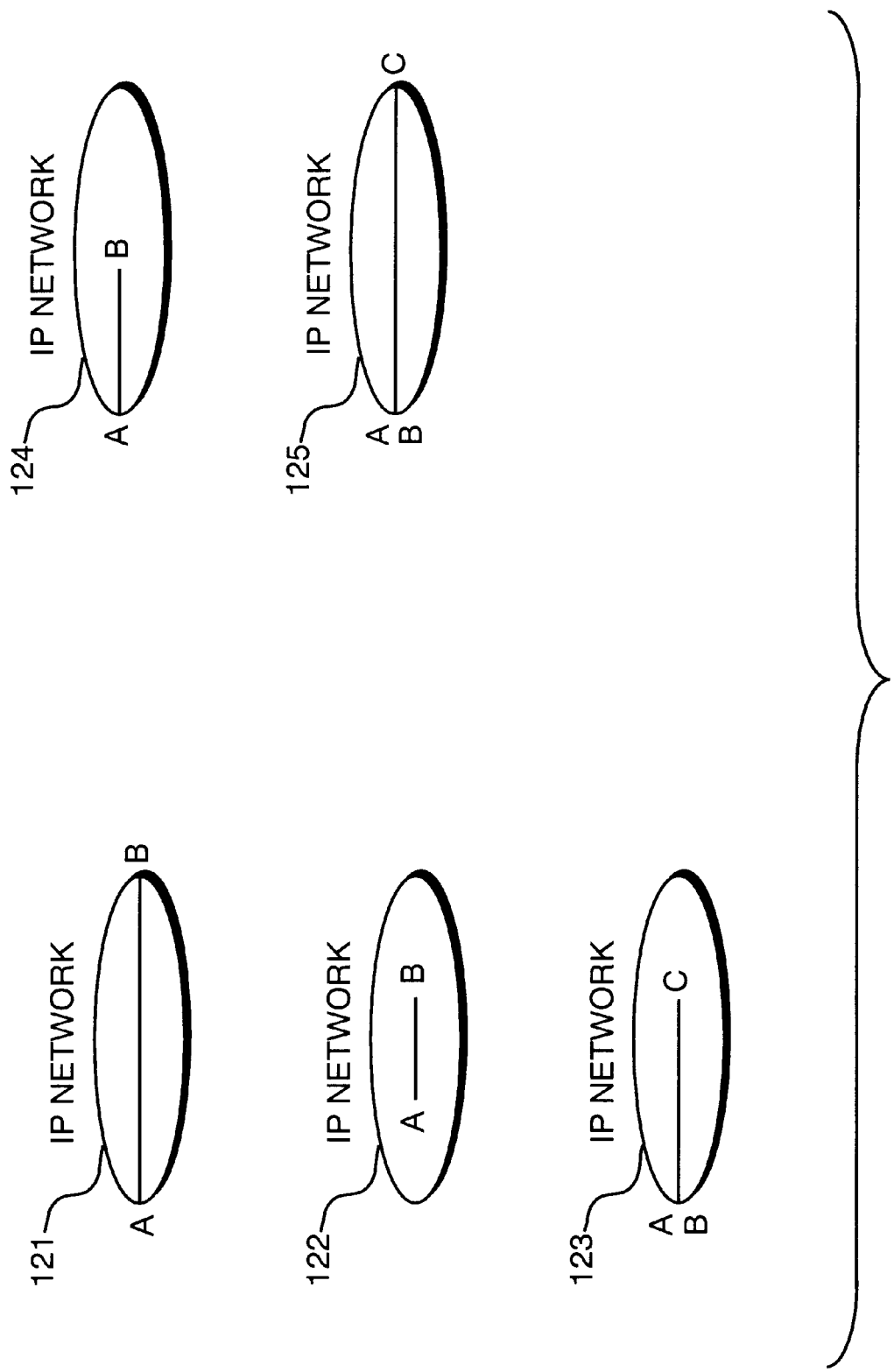
FIG. 12 illustrates possible origin and destination configurations.

Finally, in FIG. 12 is shown various examples of origin and destination configurations that are amenable to the present invention. End-to-end delays 121, delays between two points inside a network 122, round trip delays from A to C to B 123 (where A and B are at the same location), end to intermediate node delays 124, and round trip delays from A to C to B 125 (where A and B are at the same location) may all be computed using systems and methods of the present invention.

The principles consistent with the present invention admit many generalizations. For example, although stochastic processes having Poisson statistics are mentioned by name herein, other stochastic processes may be possible. For example, for the principles of the invention to hold, it is sufficient that the fraction of arrivals, in a realization of the stochastic process, that see a particular delay be equal, in the long time limit, to the time average delay. Such stochastic processes may be said to have the ASTA condition. I.e., arrivals see time averages.

Also, while time averages and ensemble averages were used above, other mathematical objects may be used to non-trivially relate probe packet delays to data packet delays.

While the invention has been disclosed in connection with the preferred embodiments shown and described in detail, various modifications and improvements thereon will become readily apparent to those skilled in the art. Accordingly, the spirit and scope of the present invention are to be limited only by the following claims.

We claim:

1. A method of estimating data delays in transmitting data packets from a first location to a second location on a computer network comprising identifying a bottleneck link in a path connecting the first location to the second location;

determining a queuing delay of probes at the bottleneck link by injecting probe packets at the first location according to departure statistics governing a probability distribution such that arrival times of the probe packets at the second location are consistent with the probability distribution; and estimating a queuing delay of data from the queuing delay of probes at the bottleneck link.

2. A method of estimating data delays in transmitting data packets from a first location to a second location on a computer network as in claim 1, further comprising adding a sum of data service times and a propagation delay to the queuing delay to obtain an estimate of the data delays.

3. A method of estimating data delays in transmitting data packets from a first location to a second location on a computer network as in claim 2, wherein determining a queuing delay of probes at the bottleneck link by injecting probe packets at the first location includes subtracting a sum of probe service times and a propagation delay from first location to second location probe delays.

4. A method of estimating data delays in transmitting data packets from a first location to a second location on a computer network as in claim 2, wherein determining a queuing delay of probes at the bottleneck link by injecting probe packets at the first location includes injecting probe packets according to a Poisson distribution.

5. A method of estimating data delays in transmitting data packets from a first location to a second location on a computer network as in claim 2, further comprising determining a data packet length distribution served by the bottleneck link.

6. A method of estimating data delays in transmitting data packets from a first location to a second location on a computer network comprising transmitting probe packets on the computer network according to departure statistics consistent with a stochastic process such that arrival times of the probe packets at the second location are consistent with the stochastic process;

determining probe delays for said probe packets to travel from the first location to the second location;

estimating a time average from the probe delays with a prescribed accuracy; and relating the time average to the data delays.

7. A method of estimating data delays in transmitting data packets from a first location to a second location on a computer network as in claim 6, wherein transmitting probe packets on the computer network includes transmitting probe packets on the computer network from the first location to the second location.

8. A method of estimating data delays in transmitting data packets from a first location to a second location on a computer network as in claim 7, wherein transmitting probe packets on the computer network from the first location to the second location includes transmitting probe packets on the computer network from the first location to the second location according to departure statistics consistent with a Poisson process.

9. A system for estimating data delays in transmitting data packets from a first location to a second location on a computer network comprising a computer;

instructions for said computer for identifying a bottleneck link in a path connecting the first location to the second location;

instructions for said computer for determining a queuing delay of probes at the bottleneck link by injecting probe packets at the first location according to a probability distribution such that arrival times of the probe packets at the second location are consistent with the probability distribution; and instructions for said computer for estimating a queuing delay of data from the queuing delay of probes at the bottleneck link.

10. A system for estimating data delays in transmitting data packets from a first location to a second location on a computer network as in claim 9, further comprising instructions for said computer for adding a sum of data service times and a propagation delay to the queuing delay to obtain an estimate of the data delays.

11. A system for estimating data delays in transmitting data packets from a first location to a second location on a computer network as in claim 10, wherein instructions for determining a queuing delay of probes at the bottleneck link by injecting probe packets at the first location includes instructions for subtracting a sum of probe service times and a propagation delay from first location to second location probe delays.

12. A system for estimating data delays in transmitting data packets from a first location to a second location on a computer network as in claim 11, wherein the probability distribution is a Poisson distribution.

13. A system for estimating data delays in transmitting data packets from a first location to a second location on a computer network as in claim 10, further comprising instructions for determining a data packet length distribution served by the bottleneck link.

14. A system for estimating data delays in transmitting data packets from a first location to a second location on a computer network comprising a computer;

instructions for said computer for transmitting probe packets on the computer network according to departure statistics consistent with a stochastic process such that arrival times of the probe packets at the second location are consistent with the stochastic process;

instructions for said computer for determining probe delays for said probe packets to travel from the first location to the second location;

instructions for said computer for estimating a time average from the probe delays with a prescribed accuracy; and instructions for said computer for relating the time average to the data delays.

15. A system for estimating data delays in transmitting data packets from a first location to a second location on a computer network according to claim 14, wherein the stochastic process is a Poisson process.

16. A method of approximating a time average of a time-dependent variable, V, said variable representing a virtual delay of a packet upon arrival at a network link at a time t, comprising sending N probe packets to said data link;

recording a time of arrival, $A_k$, where $1 \leq k \leq N$, of each of the N probe packets at said data link;

calculating a sum of $V(A_k)$, from k=1 to $k_{max}$, where $k_{max}$ and only $k_{max}$, of the N probe packets arrive at said data link before or at the time t;

calculating an expectation value of a number of packets to arrive at said data link;

calculating an estimator, $Z(t)$, given by the quotient of said sum and said expectation value of a number of packets; and approximating said time average by said estimator by bounding a variance of a difference between said estimator and said time average, said variance given by an expectation value of a time average of V(t)², divided by said expectation value of a number of packets.

17. A method of approximating a time average of a time-dependent variable V, said time average given by $$\frac{1}{t}\int_0^t V(s)\,dt,$$

where V represents a virtual delay of a packet upon arrival at a network link at the time t, comprising sending N probe packets to said data link so that a first of the N probe packets arrives at time $A_1$, a second at time $A_2$, a third at time $A_3$, ..., and an Nth at time $A_N$, where the times $A_1 \leq A_2 \leq A_3 \leq \ldots \leq A_N$ are consistent with a Poisson process of rate $\lambda_p$;

calculating an estimator Z(t), given by $$Z(t) = \frac{1}{\lambda_p t} \sum_{k=1}^{k_{max}} V(A_k)$$

where $$k_{max} = \max\{k | A_k \leq t\};$$

and approximating said time average by Z(t) by bounding a variance of a difference between Z(t) and said time average, said variance given by an expectation value of $$t^{-1} \int_0^t V(s)^2 \, ds \div (\lambda_p t).$$

18. For a variable I(V(t)>x) that depends on a time t and a parameter x, a method of approximating a time average of the variable I(V(t)>x), said variable I(V(t)>x) equal to unity if V(t), a virtual delay of a packet upon arrival at a network link at a time t, is greater than the parameter x, and equal to zero otherwise, comprising sending N probe packets to said data link;

recording a time of arrival, $A_k$, where $1 \leq k \leq N$. of each of the N probe packets at said data link;

calculating a sum of $I(A_k > x)$, from k=1 to $k_{max}$=, where $k_{max}$, and only $k_{max}$, of the N probe packets arrive at said data link before or at the time t, and $I(A_k > x)$ is equal to unity if $A_k$ is greater than the parameter x, and equal to zero otherwise;

calculating an expectation value of a number of packets to arrive at said data link;

calculating an estimator, Z(t), given by the quotient of said sum and said expectation value of a number of packets; and approximating said time average by said estimator by bounding a variance of a difference between said estimator and said time average, said variance given by an expectation value of a time average of I(V(t)>x)² divided by said expectation value of a number of packets.

19. A method of approximating a time average of a variable I(V(t)>x) that depends on a time t and a parameter x, said time average given by $$\frac{1}{t}\int_0^t I(V(t) > x)\,dt,$$

where the variable I(V(t)>x) is equal to unity if V(t), a virtual delay of a packet upon arrival at a network link at a time t, is greater than x, and equal to zero otherwise, comprising sending N probe packets to said data link so that a first of the N probe packets arrives at time $A_1$, a second at time $A_2$, a third at time $A_3$, ..., and an Nth at time $A_N$, where the times $A_1 \leq A_2 \leq A_3 \leq \ldots \leq A_N$ are consistent with a Poisson process of rate $\lambda_p$;

calculating an estimator Z(t), given by $$Z(t) = \frac{1}{\lambda_p t} \sum_{k=1}^{k_{max}} I(A_k > x)$$

where $k_{max} = \max\{k | A_k > t\}$, and $I(A_k > x)$ is equal to unity if $A_k$ is greater than the parameter x, and equal to zero otherwise; and approximating said time average by Z(t) by bounding a variance of a difference between Z(t) and said time average, said variance given by an expectation value of $$t^{-1}\int_0^t I(V(s) > x)^2 \, ds \div (\lambda_p t).$$

20. A method of approximating an expectation value, $E(W^d)$, of a delay experienced by a data packet arriving at a network link, comprising computing a time average of a time-dependent variable, V(t), said variable representing a virtual delay of a packet upon arrival at the network link at a time t, where said time average is given by $$\frac{1}{t}\int_0^t V(s)\,ds;$$

computing an expectation value, E(U), of a packet size;

computing an expectation value, $E(U^2)$, of a square of the packet size, utilizing said time average, said expectation value of a packet size, said expectation value of a square of the packet size, and a server utilization, ρ, to approximate said expectation value of a delay.

21. A method of approximating an expectation value, $E(W^d)$ of a delay experienced by a data packet arriving at a network link as in claim 20, wherein utilizing said time average, said expectation value of a packet size, said expectation value of a square of the packet size, and a server utilization, ρ, includes utilizing said time average, said expectation value of a packet size, said expectation value of a square of the packet size, and a server utilization, ρ, to approximate said expectation value of a delay according to $$E(W^d) \approx \frac{1}{\rho}\frac{1}{t}\int_0^t V(s)\,ds - \frac{E(U^2)}{2E(U)}.$$

22. A method of approximating an expectation value, $E(I(W^d>x))$, of a variable $I(W^d>x)$ that depends on a parameter x, said variable $I(W^d>x)$ equal to unity if a delay of a data packet upon arrival at a network link is greater than x, and equal to zero otherwise, comprising computing a time average of a variable $I(V(t)>x)$, said variable $I(V(t)>x)$ equal to unity if V(t), a virtual delay of a packet upon arrival at the network link at a time t, is greater than the parameter x, and equal to zero otherwise.

23. A method of approximating an expectation value, $E(I(W^d>x))$, of a variable $I(W^d>x)$ that depends on a parameter x as in claim 22, further comprising approximating said expectation value according to $$E(I(W^d>x)) \approx \frac{1}{\rho t}\int_0^t I(V(s)>x)\,ds.$$

* * * * *